United States Patent [19]

Jones et al.

[11] Patent Number: 4,647,203

[45] Date of Patent: Mar. 3, 1987

[54] FIBER OPTIC SENSOR

[75] Inventors: Roger E. Jones, Little Shelford; Roland H. Pratt, Stevenage, both of England

[73] Assignee: International Standard Electric Corporation, New York, N.Y.

[21] Appl. No.: 709,488

[22] Filed: Mar. 7, 1985

[30] Foreign Application Priority Data

Mar. 10, 1984 [GB] United Kingdom ............... 8406319

[51] Int. Cl.$^4$ ............................................. G01B 9/02
[52] U.S. Cl. .................................. 356/345; 356/352
[58] Field of Search ................................ 356/345, 352

[56] References Cited

U.S. PATENT DOCUMENTS 4,329,058 5/1982 James et al. ...................... 356/352
4,482,248 11/1984 Papuchon et al. .............. 356/352 X

OTHER PUBLICATIONS

Franzen et al., "Long Optical-Fiber Fabry-Perot Interferometers", Applied Optics, vol. 20, No. 23, pp. 3991-3992, 12/81.

Primary Examiner—Davis L. Willis
Assistant Examiner—Matthew W. Koren
Attorney, Agent, or Firm—John T. O'Halloran; Robert P. Seitter

[57] ABSTRACT

An optical fibre Fabry-Perot etalon can be used as a sensor if the parameter being monitored is allowed to influence the etalon's length, e.g. by pressure, temperature, magneto-strictive effects, piezo-electric effects, acoustically, etc. However, with single-mode fibre and only one set of peaks in the transmission function the device is direction insensitive so that the sign of the parameter being monitored cannot be detected.

In the present arrangement the etalon is driven in such a way as to support two different path-length distinct transmission modes, e.g. by the use as a light source of a laser emitting light at 1.3 micrometers wavelength. Two sequences of peaks are then produced in the transmission function which are peaks of different sizes, so that the transmission function is asymmetrical. The peaks are separated at the detection circuitry by discriminations followed by pulse counting means so that the arrangement becomes sign responsive.

2 Claims, 2 Drawing Figures

FIBER OPTIC SENSOR

BACKGROUND OF THE INVENTION

This invention relates to sensors for the sensing and measurement of a variety of parameters including temperature, pressure, etc.

In these arrangements the sensing element, which is subjected to the parameter to be sensed and measured is an optical fibre Fabry-Perot interferometer. Such an interferometer consists of a length of an optical fibre with semi-silvered optically flat ends, which ends thus act as mirrors for the interferometer. The influence of the parameter being sensed, which can be exercised in various ways, e.g. by magneto-strictive means, piezoelectric means, thermal effects, acoustic effects, varies the length of the fibre. Thus detection depends on measuring the changes in the transmitted signals as functions of changes in length of the Fabry-Perot interferometer. Such a Fabry-Perot interferometer may use relatively long optical fibres, e.g. 40 cm or longer, say 100 cm.

SUMMARY OF THE INVENTION

An object of the invention is to provide an improved sensor arrangement of the type referred to above.

According to the present invention, there is provided an optical fibre sensor arrangement, which includes an optical fibre Fabry-Perot etalon which uses single-mode fibre and which can support two or more transverse modes of radiation which are path-length distinct each of which modes produces its own sequence of peaks in the transmission characteristics of the sensor, the peaks in the two sequences being of different amplitudes so that the transmission function is asymmetrical, wherein the parameter being monitored is applied to the etalon in such a way as to vary the path length of the fibre, thus varying the number of said peaks which are produced in each of said sequences of peaks, and wherein read-out means associated with the sensor monitors the number of peaks produced from each sequence, and thus the value and sign of the parameter to which the sensor has been subjected.

DESCRIPTION OF PREFERRED EMBODIMENT

The transmission function of a single-mode all-fibre Fabry-Perot etalon used as an interferometer consists of a series of identical and evenly-spaced peaks. Modulation of the length of the fibre when used in a sensor causes fluctuations in the light intensity seen at a detector at one end of the fibre. This light comes from the other end of the etalon, e.g. from a laser with stabilised output. Since the transmission function of the sensor fibre is symmetrical, no information is obtainable as to the sign of the perturbation of the fibre due to the influence of the parameter being sensed.

In the present arrangement the fibre used is one which supports more than one transverse mode of the radiation used. A single mode fibre has an operating wavelength at which it functions in a single mode manner, and a lower wavelength at which it will support two or more transverse modes. When operating in single mode manner the light goes through virtually in a straight line manner, whereas in the case of the transverse modes, it bounces off the core-cladding interface as it negotiates the fibre. In the present case a fibre which is single mode at 1.3 micrometer wavelength is used, as this is readily available commercially. Such a fibre supports four transverse modes when illuminated by a 0.633 micrometre source. Another fibre which could conveniently be used is one which supports two or more modes at 0.85 micrometers. This is useful because 0.85 micrometer lasers are readily available.

Figure 2:
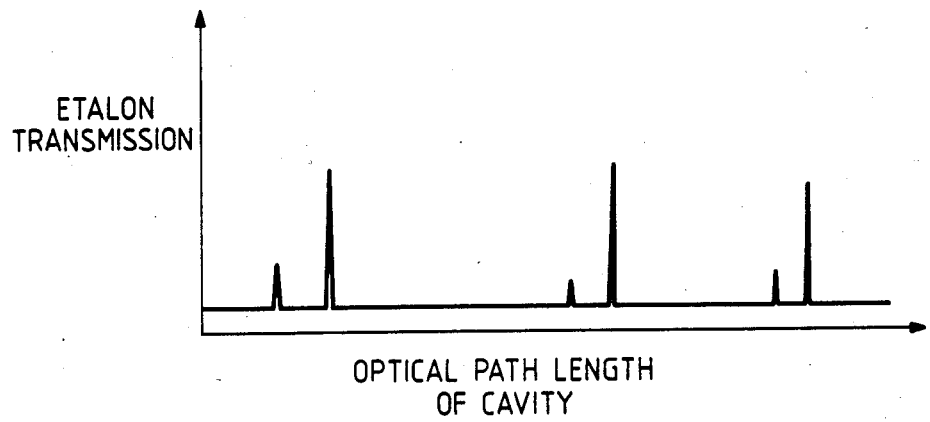
FIG. 2 is a graph representing the characteristics of an etalon as used in FIG. 2.

When using the 1.3 micrometer fiber, three of these modes are path length degenerate, so that there are two distinct, in path length, modes supported by the fibre. The energy in each of these distinct modes is dependent on the light source (usually a laser)—fibre launch condition. Hence two series of peaks occur in the transmission functions, and these peaks do not coincide. In general the peaks in the two series are of different amplitude, with the result that the transmission function becomes asymmetrical. The characteristics of such an etalon as shown in FIG. 2, where the two sets of peaks are shown. The difference in amplitude between the peaks of one set and the peaks of the other set is clearly apparent.

With such an arrangement the sign of the perturbation of the fibre due to the parameter being sensed is detected by observing the ordering and spacing of the peaks in the transmission circuit using a discriminating circuit fed from the etalon's detector. The intensities of these peaks is registered using a photodetector, and logic circuits, which can be relatively simple, are used to determined the number of peaks and their order of appearance at the detector. With two modes supported in the fibre, mode 1 is represented in such circuitry by logic 1 and mode 2 by logic 0.

An etalon of the type referred to is made by coating the optically flat ends of an optical fibre with reflective material so that the fibre becomes a Fabry-Perot etalon. When such an etalon is used as a sensor incident light enters the fibre at one end and eventually leaves it at the other end, with its transmission function influenced by the parameter to be monitored. As already indicated, the transmission function of such a system consists of a series of sharp transmission peaks, and in a fibre which supports two transverse modes there are two series of these transmission peaks. Variations in the optical length of the fibre or the wavelength of the source of light cause variations in the transmitted intensity through the fibre. Such a fibre can be used for sensing, where changes in temperature or pressure radically alter the optical path length along the fibre. The detection techniques involve pulse counting of the two series of peaks, after discrimination circuitry has separated them, to determine the number of peaks. This gives an indication of the magnitude of the parameter being sensed, and due to the differing amplitudes of the peaks, the positions of the peaks of the two series with respect to each other indicating the sign of the parameter.

Figure 1:
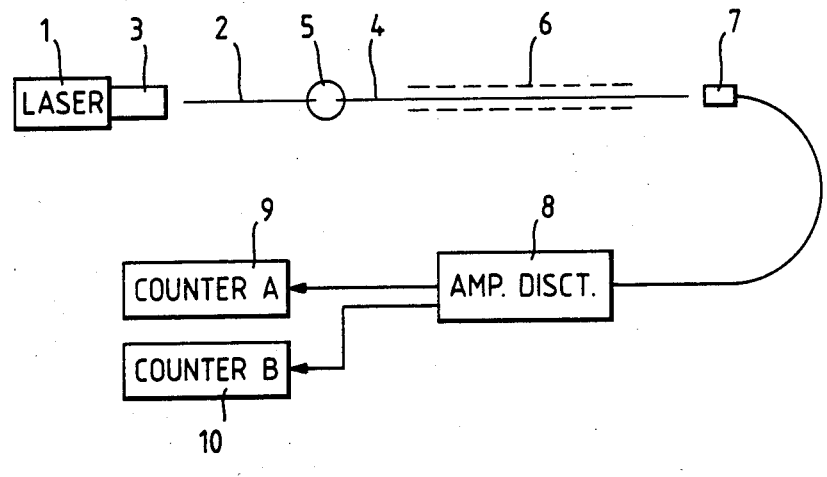
FIG. 1 is a highly simplified representation of a sensor system embodying the invention.

Referring to FIG. 1, we there see a laser 1, which is the light source, feeding the end of an optical fibre 2 via a suitable lens system 3. This fibre 2 is coupled to the etalon 4 via an optical coupler 5. This coupler may be in the form of a GTE elastomeric splice. Such splices are available from GTE Products Corporation, 2401 Reach Road, Willensport, PA 17701, USA.

The etalon 4 is provided with a suitable arrangement, shown at 6, for enabling the parameter being monitored to influence the etalon's path length. The output end of the etalon faces a photo-detector 7 which is coupled to an amplitude discriminator 8. This latter routes peaks above a preset threshold to a first counter 9, and peaks below that threshold to another counter 10. Hence the required separate counting of the peaks of the two sets is effected.

We claim:

1. An optical fibre sensor arrangement, which includes an optical fibre Fabry-Perot etalon which uses single-mode fibre and which can support two or more transverse modes of radiation which are path-length distinct each of which modes produces its own sequence of peaks in the transmission characteristics of the sensor, the peaks in the two sequences being of different amplitudes so that the transmission function is asymmetrical, wherein the parameter being monitored is applied to the etalon in such a way as to vary the path length of the fibre, thus varying the number of said peaks which are produced in each of said sequences of peaks, and wherein read-out means associated with the sensor monitors the number of peaks produced from each sequence, and thus the value and sign of the parameter to which the sensor has been subjected.

2. An optical fibre sensor arrangement, which includes an optical fibre Fabry-Perot etalon which uses single-mode fibre and which can support two or more transverse modes of radiation which are path-length distinct each of which modes produces its own sequence of peaks in the transmission characteristics of the sensor, the peaks in the two sequences being of different amplitudes so that the transmission function is asymmetrical, wherein the parameter being monitored is applied to the etalon in such a way as to vary the path length of the fibre, thus varying the number of said peaks which are produced in each of said sequences of peaks, wherein a photodetector associated with the etalon applies the sequences of peaks propagating in the etalon to a discrimination circuit which determines the order in which respective peaks of the two sequences occur, and thus the sign of the parameter to which the sensor has been subjected, and wherein counting means associated with the sensor monitors the number of peaks produced from each sequence, so that both the value and the sign of the parameter to which the sensor has been subjected are determined.

* * * * *